United States Patent
Ren et al.

(10) Patent No.: US 11,566,097 B2
(45) Date of Patent: Jan. 31, 2023

(54) DEGRADABLE POLYMER COMPOSITION FOR USE IN DOWNHOLE TOOLS AND METHOD OF MANUFACTURING

(71) Applicants: CNPC USA Corp., Houston, TX (US); Beijing Huamei Inc., Beijing (CN)

(72) Inventors: Jiaxiang Ren, Katy, TX (US); Peng Cheng, Sugar Land, TX (US); Xu Wang, Houston, TX (US)

(73) Assignees: CNPC USA CORP., Houston, TX (US); BEIJING HUAMEI INC., Beijing (CN)

( * ) Notice: Subject to any disclaimer, the term of this patent is extended or adjusted under 35 U.S.C. 154(b) by 254 days.

(21) Appl. No.: 16/789,946

(22) Filed: Feb. 13, 2020

(65) Prior Publication Data

US 2021/0253773 A1   Aug. 19, 2021

(51) Int. Cl.
| | |
|---|---|
| C08G 18/24 | (2006.01) |
| C08G 18/10 | (2006.01) |
| C08G 18/42 | (2006.01) |
| E21B 33/12 | (2006.01) |
| C08G 18/76 | (2006.01) |

(Continued)

(52) U.S. Cl.
CPC ............ *C08G 18/10* (2013.01); *B29B 7/86* (2013.01); *C08G 18/242* (2013.01); *C08G 18/42* (2013.01); *C08G 18/73* (2013.01); *C08G 18/7621* (2013.01); *C08G 18/7628* (2013.01); *E21B 33/1208* (2013.01); *C08G 2230/00* (2013.01)

(58) Field of Classification Search
CPC ...... C08G 18/10; C08G 18/242; C08G 18/42; C08G 18/73; C08G 18/7621; C08G 18/7628
See application file for complete search history.

(56) References Cited

U.S. PATENT DOCUMENTS

| | | | |
|---|---|---|---|
| 4,096,129 A | * | 6/1978 | Cook ............... C08G 63/12 528/61 |
| 8,276,670 B2 | | 10/2012 | Patel |

(Continued)

*Primary Examiner* — Michael L Leonard

(57) ABSTRACT

A chemical composition for a degradable polymeric material includes an isocyanate terminated polyester prepolymer, including prepolymer units as a main chain with a plurality of isocyanates at ends of the main chain, and a cross-linking agent. The isocyanate terminated polyester prepolymer has a structural formula as follows:

ONC—R″—NH—[—CO—R—R′″-]n-NH—R″—CNO, wherein R′″ is selected from a group consisting of —O— and —CO—O—R'—O—,

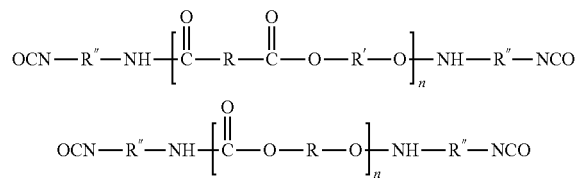

wherein R, R' and R″ are an aryl group or alkyl group and wherein n is a number of prepolymer units corresponding to length of the main chain. The composition degrades at a rate and at a delay depending on temperature and the composition for a component of a downhole tool. The composition has strength and elasticity for a component of a downhole tool.

16 Claims, 6 Drawing Sheets

(a) commercial dissolvable rubber (b) CNPC-DR-F (c) CNPC-DR-LBK

(51) Int. Cl.
*C08G 18/73* (2006.01)
*B29B 7/86* (2006.01)

(56) References Cited

U.S. PATENT DOCUMENTS

| | | | |
|---|---|---|---|
| 9,790,763 B2 | 1/2017 | Fripp et al. | |
| 2005/0197478 A1* | 9/2005 | Watanabe | C08G 18/10 528/49 |
| 2013/0319682 A1 | 12/2013 | Tschetter et al. | |
| 2016/0145376 A1* | 5/2016 | Chen | D01F 6/94 264/211 |
| 2017/0145145 A1* | 5/2017 | Narine | C08G 18/4236 |
| 2018/0016411 A1* | 1/2018 | Wang | C08K 5/09 |

\* cited by examiner (a) commercial dissolvable rubber (b) CNPC-DR-F (c) CNPC-DR-LBK

DEGRADABLE POLYMER COMPOSITION FOR USE IN DOWNHOLE TOOLS AND METHOD OF MANUFACTURING

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a material composition in the oil and gas industry. More particularly, the present invention relates to degradable polymer compositions to form components of downhole tools. Even more particularly, the present invention relates to a degradable elastomer for sealing components of downhole tools.

2. Description of Related Art Including Information Disclosed Under 37 CFR 1.97 and 37 CFR 1.98

A plug is a downhole tool used in oil and gas operations. Non-conventional oil and gas production has replaced millable composite plugs with dissolvable plugs in downhole operations, like fracturing operations. After the fracturing, the dissolvable plug is dissolved in the downhole fluids. Milling to remove a milling composite plug is no longer required. Therefore, the operation time and costs of milling were saved. A dissolvable elastomer or degradable polymer is an essential component of each dissolvable plug because a dissolvable plug still requires sealing. Even the material for sealing must be degradable along with the other hard components of the dissolvable plug. A degradable polymer is used as a sealing material needed for dissolvable plugs.

The degradable polymer or dissolvable elastomer still must be capable of sealing other materials. Maintaining sufficient elasticity for certain time period, such as more than 12 hours to complete a fracturing operation, is a necessary feature of a degradable polymer for a dissolvable downhole tool, such as a dissolvable plug. Additionally, the degradable polymer or dissolvable elastomer must be capable of degrading or dissolving as fast as possible in the downhole fluid after performing the fracturing operation.

The disclosure of degradable polymers or dissolvable elastomers or dissolvable rubbers are known in the prior art intended for a variety of conditions. US Publication No. 20170152371 published on 1 Jun. 2017 for Duan et al, U.S. Pat. No. 9,790,763, issued on 17 Oct. 2017 to Fripp et al, and US Publication No. 20170158942, published on 8 Jun. 2017 for Okura et al. disclose degradable polymers.

The patent discloses a method to manufacture high strength degradable rubber with controlled dissolution rate. The degradable rubber is a polyester-polyurethane copolymer and copolymer was crosslinked with selective cross-linkers. The dissolution rate was accelerated by mixing with selective catalysts. The dissolution rate of the degradable rubber is faster than the typical degradable rubbers in the market.

This invention discloses an improved high strength and high elongation water degradable polymer material and its application in downhole oil tools. The high strength water degradable polymer displayed faster dissolution rate than the dissolvable polymers in the market. On the other hand, the high strength degradable polymer displayed much higher elongation than the traditional elastomers and other dissolvable elastomers in the market. Furthermore, the dissolution rate of the polymer was not affected by the salinity. The degradable polymer could be used as sealing materials for many downhole tools, including but not limited to fracture plugs, bridge plugs, packers, isolation valves, etc.

It is an object of the present invention to provide a degradable polymeric material.

It is another object of the present invention to provide a degradable polymeric material for components of a downhole tool.

It is still another object of the present invention to provide a degradable polymeric material with elasticity and strength for components of a downhole tool.

It is still another object of the present invention to provide a degradable polymeric material with dissolvability to control in downhole operations.

It is yet another object of the present invention to provide a degradable polymeric material with dissolvability compatible for fluids with different salinities.

It is an object of the present invention to provide a method of forming a degradable polymeric material for components of a downhole tool.

It is an object of the present invention to provide a method of using a degradable polymeric material in a component of a downhole tool.

These and other objectives and advantages of the present invention will become apparent from a reading of the attached specification.

BRIEF SUMMARY OF THE INVENTION

Embodiments of the chemical composition for a degradable polymeric material of the present invention include an isocyanate terminated polyester prepolymer and a cross-linking agent. The isocyanate terminated polyester prepolymer includes prepolymer units as a main chain with a plurality of isocyanates at ends of the main chain with a cross-linking agent so as to be able to form components of a downhole tool. The composition dissolves or degrades initially slowly so as to maintain integrity for a downhole operation and can dissolve or degrade quickly after the downhole operation is completed. The composition maintains strength and elasticity to hold high pressure differentials during downhole operations, while remaining dissolvable.

Embodiments of the present invention also include the method of forming the degradable polymeric material. The method includes vacuuming a prepolymer unit, vacuuming a cross-linking agent, mixing the prepolymer unit and the cross-linking agent so as to form a mixture, and molding the mixture so as to form a cured polymer as a component. The step of mixing can be by centrifuge and can be under vacuum. The step of molding can include cast molding, rotational molding, or compression molding. Alternate embodiments include adding a filler during the step of mixing.

The method of using the degradable polymeric material is another embodiment of the present invention, in particular, removal of a downhole tool after a fracturing operation. The method for removal can include forming the chemical composition of the degradable polymeric material into a component, installing the component in an assembly, such as a downhole tool, dissolving the component in 0.3% KCl and a catalyst at 90° C. into a degraded component, and collapsing the assembly so as to remove the assembly and the degraded component. There can be a catalyst to speed the step of dissolving, and the degraded component may also be completely dissolved.

DETAILED DESCRIPTION OF THE INVENTION

Figure 1:
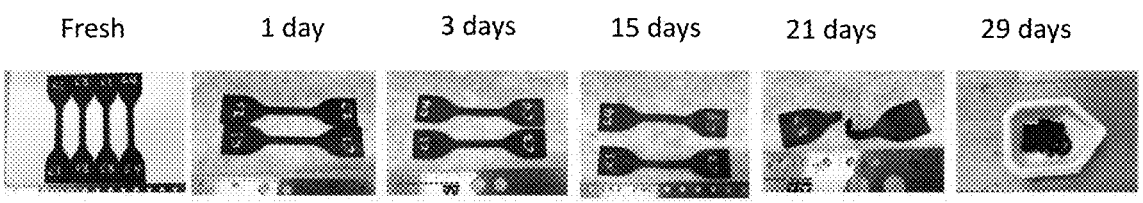
FIG. 1 are photos illustrating dissolution testing results of embodiments of degradable polymeric materials according to the present invention ((b) CNPC-DR-F and (c) CNPC-DR-LBK) and a prior art rubber material ((a) commercial dissolvable rubber) in 0.3% KCl at 90° C.
Figure 1:
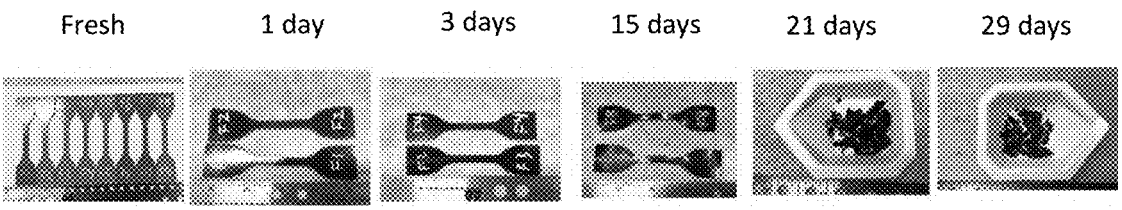
Figure 1:
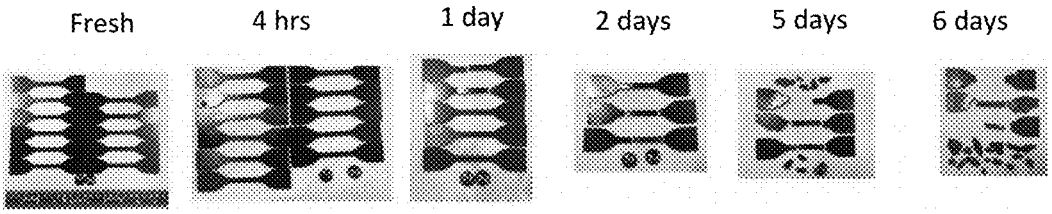

FIGS. 1-8 show the chemical composition of the present invention as a degradable polymeric material compatible for the conditions associated with downhole operations, such as hydraulic fracturing operations. When the chemical composition is formed in a component of a downhole tool, the component must have the same functionality as the conventional non-dissolving component. The component must be sufficiently strong to seal and hold a pressure differential as assembled in the downhole tool. The component must also properly dissolve in a wellbore fluid, such as a potassium chloride brine, after the downhole operation is completed. The chemical composition must not immediately dissolve too quickly in order to perform the downhole operation, while also dissolve quickly when the downhole operation is completed.

The chemical composition of the present invention is a dissolvable polymer being comprised of a polyester and polyurethane copolymer. The dissolvable polymer is an isocyanate terminated polyester prepolymer crosslinked with various crosslinker. The structure of the isocyanate terminated polyester prepolymer can be shown as below.

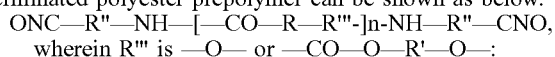

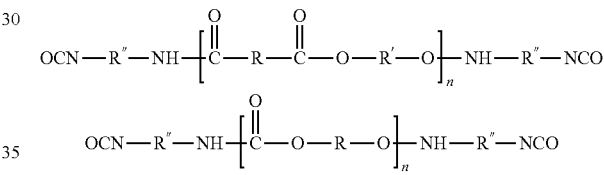

wherein R is an aryl group or alkyl group, wherein R' is an aryl group or alkyl group, wherein R" is an aryl group or alkyl group, and wherein n is a number of prepolymer units repeated corresponding to length of said main chain.

The isocyanate is preferable a low free isocyanate toluene di-isocyanate (TDI), which is helpful to achieve narrow molecular distribution, virtual crosslinking, and more defined hard-phase and soft phase separation to achieve better mechanical properties.

TDI:

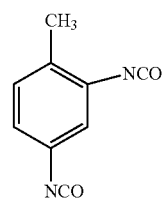

2,4-TDI

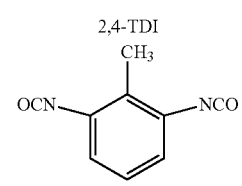

2,6-TDI

The isocyanate could also be, but not limited to methylene diphenyl diisocyanate (MDI), para-phenyl diisocyanate (pPDI), hexamethylene isocyanate (HDI) etc.

MDI:

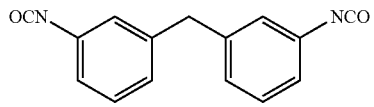

PPDI:

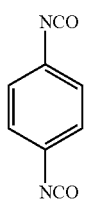

HDI:

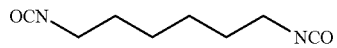

Dimethyl thio-toluene diamine:

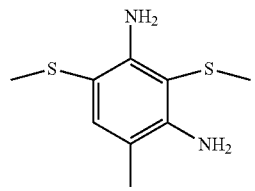

The catalysts may include dibutyltin dilaurate, dimethyl-bis(1-oxoneodecyl), octyltin dithioglycolate, and dioctyltin mercaptide.

Dibutyltin dilaurate:

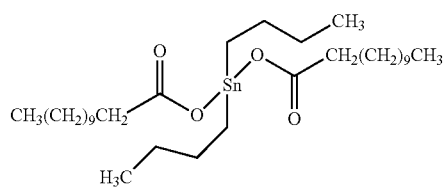

Dimethylbis(1-oxoneodecyl):

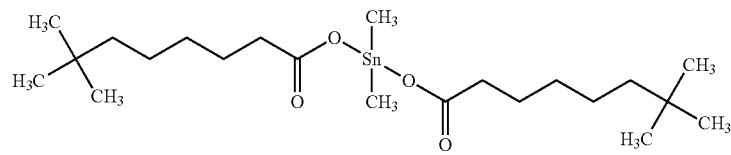 [SMILES: CC(C)(C)CCCCCC(=O)[O][Sn]([CH3])([CH3])[O]C(=O)CCCCCC(C)(C)C]

The prepolymer units or copolymers are crosslinked by different cross-linking agents or cross linkers: such diamine 4,4' methylene-bis-(o-chloroaniline), dimethyl thio-toluene diamine, diols, such as butanediol, polycarbonate polyols, polyester glycol, or triols.

4,4' methylene-bis-(o-chloroaniline):

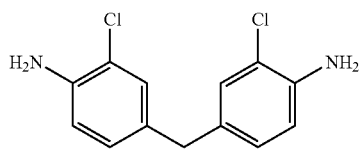

The strength of the chemical composition of the present invention can be further enhanced by incorporating fillers, such as carbon blacks, silica, nanographene, nanoclays, nanofibers, nanotubes, etc.

TABLE 1

| Formulation Name | Hardness (Shore A) | Crosslinker | Catalyst |
|---|---|---|---|
| CNPC-DR-F | 84 | dimethyl thio-toluene diamine | |
| CNPC-DR-L CNPC-DR-LBK | 84 | dimethyl thio-toluene diamine | dibutyltin dilaurate |
| CNPC-DR-D | 93 | 4, 4' methylene-bis-(o-chloroaniline) | |
| CNPC-DR-O CNPC-DR-OBK | 93 | 4, 4' methylene-bis-(o-chloroaniline) | dibutyltin dilaurate |

Table 1 summarizes the cross-linking agent and catalyst used in FIGS. 1-8 for the chemical composition of the present invention.

One method to make the dissolvable polymer is to mix the proper ratio of prepolymer with cross-linking agent or crosslinker, catalysts, reinforcing agent, pigments, surfactants, etc. The prepolymer and crosslinker were vacuumed before mixing. The mixing is achieved with centrifuge mixing or other mixing method either under vacuum or not. The mixer was then casted in a mold and then performed casting molding or rotational molding. The cured polymers were then demolded as a component and possibly post-cured. The mixture could be also compression molded in the mold until the mixture was fully cured.

Embodiments of the method for formation of a degradable polymeric material include vacuuming a prepolymer unit of the chemical composition of the present invention, vacuuming a cross-linking agent, mixing the prepolymer unit and the cross-linking agent so as to form a mixture, and molding the mixture so as to form a cured polymer as a component.

The step of mixing the prepolymer unit, the cross-linking agent, and the catalyst is by centrifuge and can be under vacuum. Additionally, the step of mixing the prepolymer unit, the cross-linking agent, and the catalyst further comprises adding a filler. The filler is selected from a group consisting of carbon blacks, silica, nanographene, nanoclays, nanofibers, and nanotubes. The step of molding the mixture comprises casting the mixture into a mold and curing the mixture or casting the mixture into a mold, rotating the mold, and curing the mixture or casting the mixture into a mold, compressing the mixture in the mold, and curing the mixture.

Figure 2:
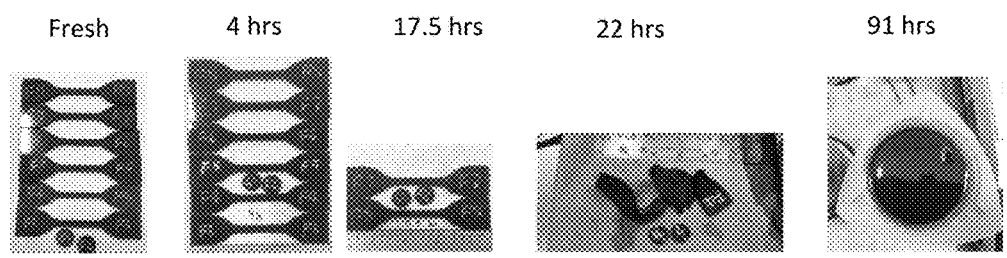
FIG. 2 are photos illustrating dissolution testing results of one of the embodiments of the degradable polymeric material according to the present invention ((b) CNPC-DR-F) in 0.3% KCl at 120° C.

FIG. 1 shows the dissolution process of a prior art composition and embodiments of the chemical composition of the present invention, including CNPC-DR-F, a TDI terminated polyester prepolymer crosslinked with dimethyl thio-toluene diamine, and CNPC-DR-LBK incorporating catalyst dibutyltin dilaurate. The test results show that CNPC-DR-F displayed faster dissolution rate than the prior art composition. The CNPC-DR-F disintegrated to pieces in 15 days, while the prior art composition disintegrated in pieces in 21 days. Per incorporating the catalyst, dibutyltin dilaurate, CNPC-DR-LBK disintegrated to pieces in 5 days. FIG. 2 shows the dissolution process of CNPC-DR-F in 0.3% KCl at 120° C. It was observed that the chemical composition of the present invention completely dissolved in the aqueous solution in 4 days, which suggested the chemical composition of the present invention disintegrated to small molecular, small acids, small alcohols, small ureas, etc.

Figure 3:
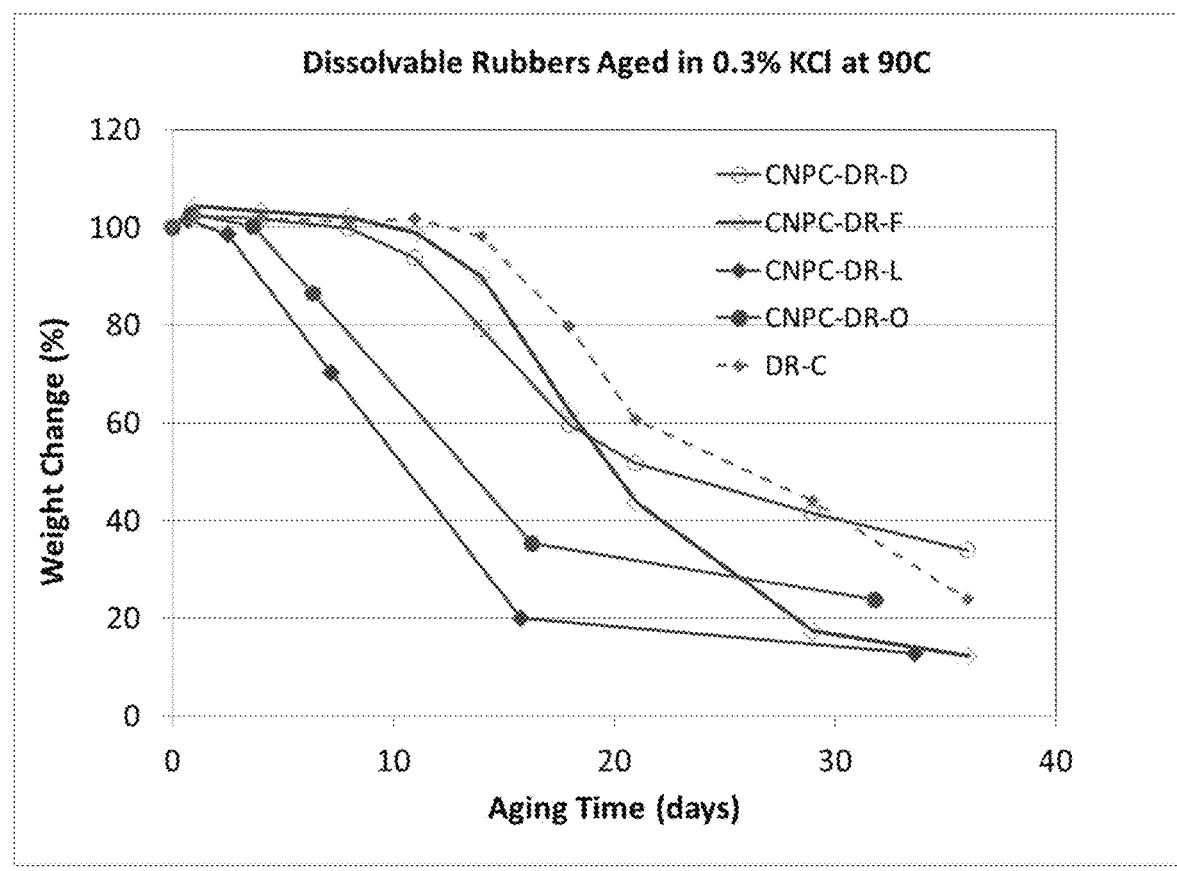
FIG. 3 is a graph illustration of weight change and time, showing dissolution rates of embodiments of degradable polymeric materials according to the present invention (CNPC-DR-D, CNPC-DR-F, CNPC-DR-LBK, and CNPC-DR-O) and a prior art rubber material (DR-C) in 0.3% KCl at 90° C.

FIG. 3 shows the weight change of several embodiments of the chemical composition of the present invention as a function of aging time in 0.3% KCl at 90° C. CNPC-DR-D is a TDI terminated polyester prepolymer crosslinked with 4,4' methylene-bis-(o-chloroaniline). CNPC-DR-O incorporating catalyst dibutyltin dilaurate. The weight and hardness of the embodiments of the chemical composition of the present invention did not change much in less than 2 days, which helped the sealing element according to the invention hold high pressure differential. On the other hand, CNPC-DR-F and CNPC-DR-LBK reduced 80% weight in less than 30 days and 18 days, respectively. The weight reduction rate of all the four embodiments of the chemical composition of the present invention is faster than the prior art composition.

Figure 4:
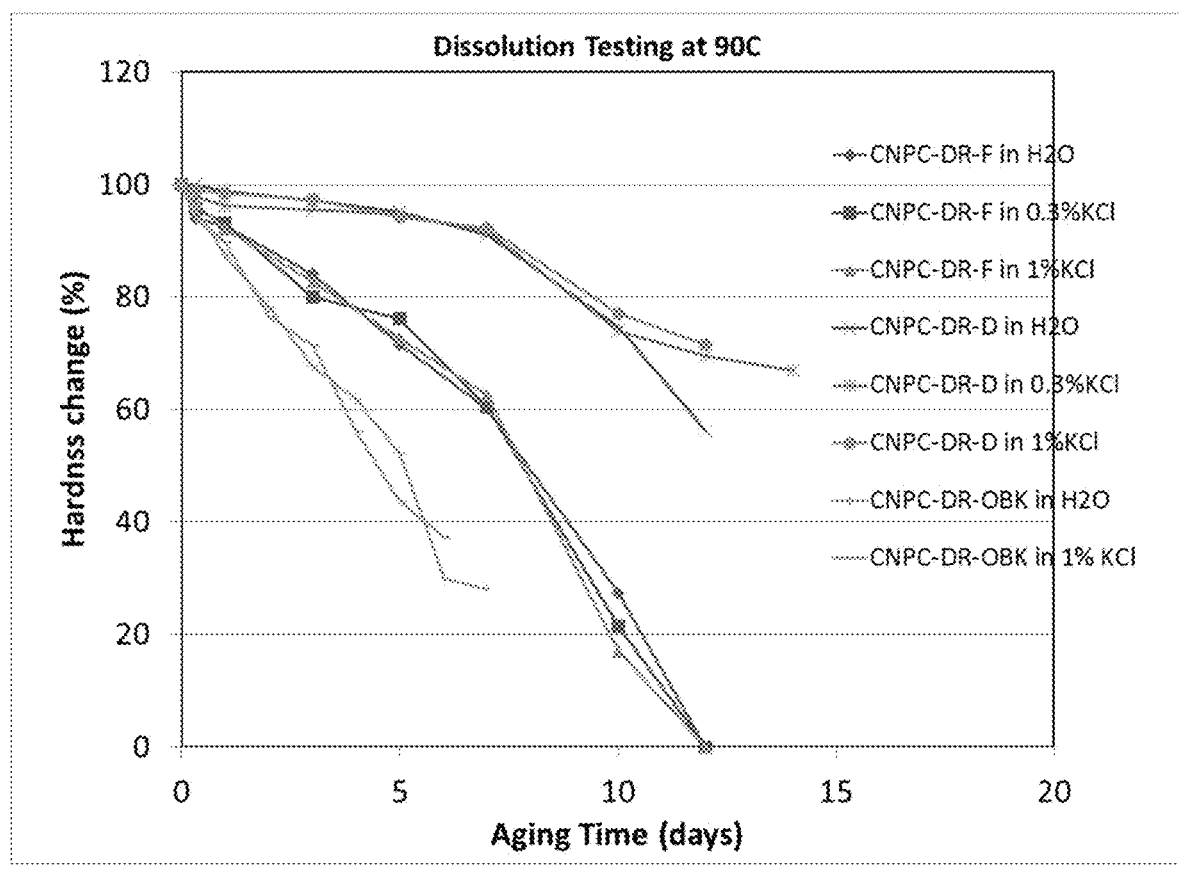
FIG. 4 is a graph illustration of hardness change and time, showing dissolution rates of embodiments of degradable polymeric materials according to the present invention (CNPC-DR-F, CNPC-DR-D, and CNPC-DR-OBK) and prior art rubber material (HNBR 75A, HNBR 90A) at room temperature.

FIG. 4 shows the hardness change of three embodiments of the chemical composition of the present invention soaked in KCl with different concentrations at 90° C. It was observed that the dissolution rate of embodiments of the chemical composition of the present invention was not affected by the concentration of KCl. The results suggested the embodiments of the chemical composition of the present invention are versatile when used in various downhole environments.

FIG. 1-4 show that embodiments of the chemical composition of the present invention reach fracturing failure between 22 hours and 15 day depending on temperature and salinity, maintain less than 5% weight loss within 2 days and delay more than 40% weight loss within 20 days depending on temperature and salinity, and maintain less than 5% hardness loss within 2 days depending on temperature and salinity. These results establish that the chemical composition has the suitable dissolvability to remain initial intact for the fracturing operation and then degrade or completely dissolve when removed. The isocyanate terminated polyester prepolymer and the cross-linking agent reach fracturing failure in 0.3% KCl at 90° C. within 15 days and in 1.0% KCl at 93° C. within 4 days, and in 0.3% KCl at 120° C. within 22 hours. The isocyanate terminated polyester prepolymer and the cross-linking agent maintain less than 5% weight loss in 0.3% KCl at 90° C. within 2 days, and the isocyanate terminated polyester prepolymer and the cross-linking agent display more than 40% weight change in 0.3% KCl at 90° C. within 20 days. The isocyanate terminated polyester prepolymer and the cross-linking agent maintain less than 5% weight loss in 0.3% KCl with a catalyst at 90° C. within 2 days, and the isocyanate terminated polyester prepolymer and the cross-linking agent display more than 60% weight change in 0.3% KCl with the catalyst at 90° C. within 20 days. The isocyanate terminated polyester prepolymer and the cross-linking agent also maintain less than 5% hardness loss in 0.3% KCl at 90° C. within 2 days.

Figure 5:
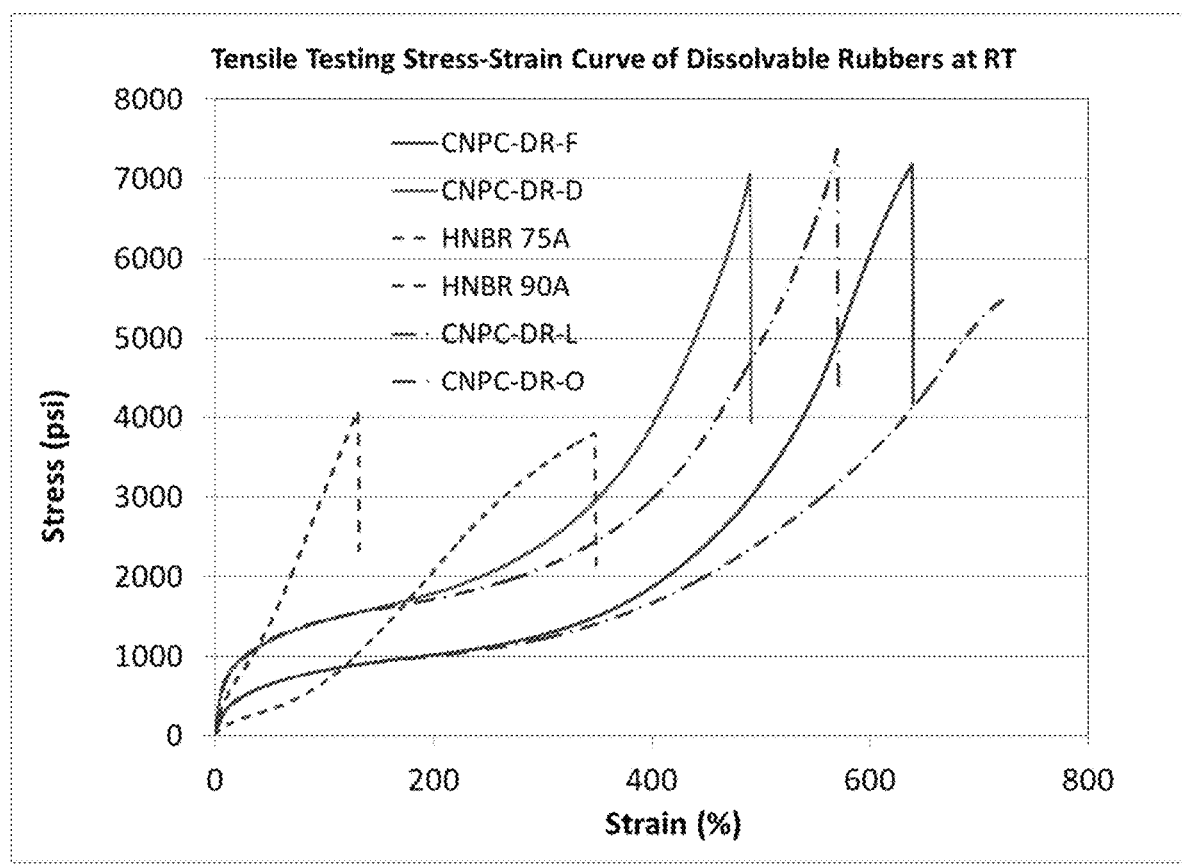
FIG. 5 is a graph illustration of stress and strain, showing tensile properties of embodiments of degradable polymeric materials according to the present invention (CNPC-DR-F, CNPC-DR-D, CNPC-DR-L, and CNPC-DR-O) in 0% KCL, 0.3% KCl, and 1.0% KCl at 90° C.

FIG. 5 shows the tensile stress-strain curves for several embodiments of the chemical composition of the present invention in comparison of prior art compositions as common HNBR with 75 and 90 Shore A at room temperature. The tensile strength and elongation of the four embodiments of the chemical composition of the present invention were much higher than the prior art compositing, including the HNBR of FIG. 5. The tensile properties of the embodiments of the chemical composition of the present invention are summarized in Table 2. The tensile strength and elongation of typical dissolvable rubber at room temperature in the market are ~3000 psi, 300%, respectively. The tensile strength and elongation of the embodiments of the chemical composition of the present invention are much higher than that of the typical dissolvable rubbers in the market.

TABLE 2

| | Tensile properties at room temperature | | | | |
| --- | --- | --- | --- | --- | --- |
| Sample | Ave. Tensile Strength (psi) | Ave.Elong. at Break (%) | Ave. M50 (psi) | Ave. M100 (psi) | Ave. M200 (psi) |
| HNBR 75A | 3811 | 350 | 324 | 680 | 2081 |
| CNPC-DR-F | 6973 | 585 | 682 | 883 | 1095 |
| CNPC-DR-L | 5476 | 720 | 642 | 825 | 1002 |
| HNBR 90A | 4001 | 128 | 1362 | 3056 | |
| CNPC-DR-D | 7009 | 456 | 1130 | 1387 | 1754 |
| CNPC-DR-O | 7673 | 568 | 1210 | 1454 | 1717 |

Figure 6:
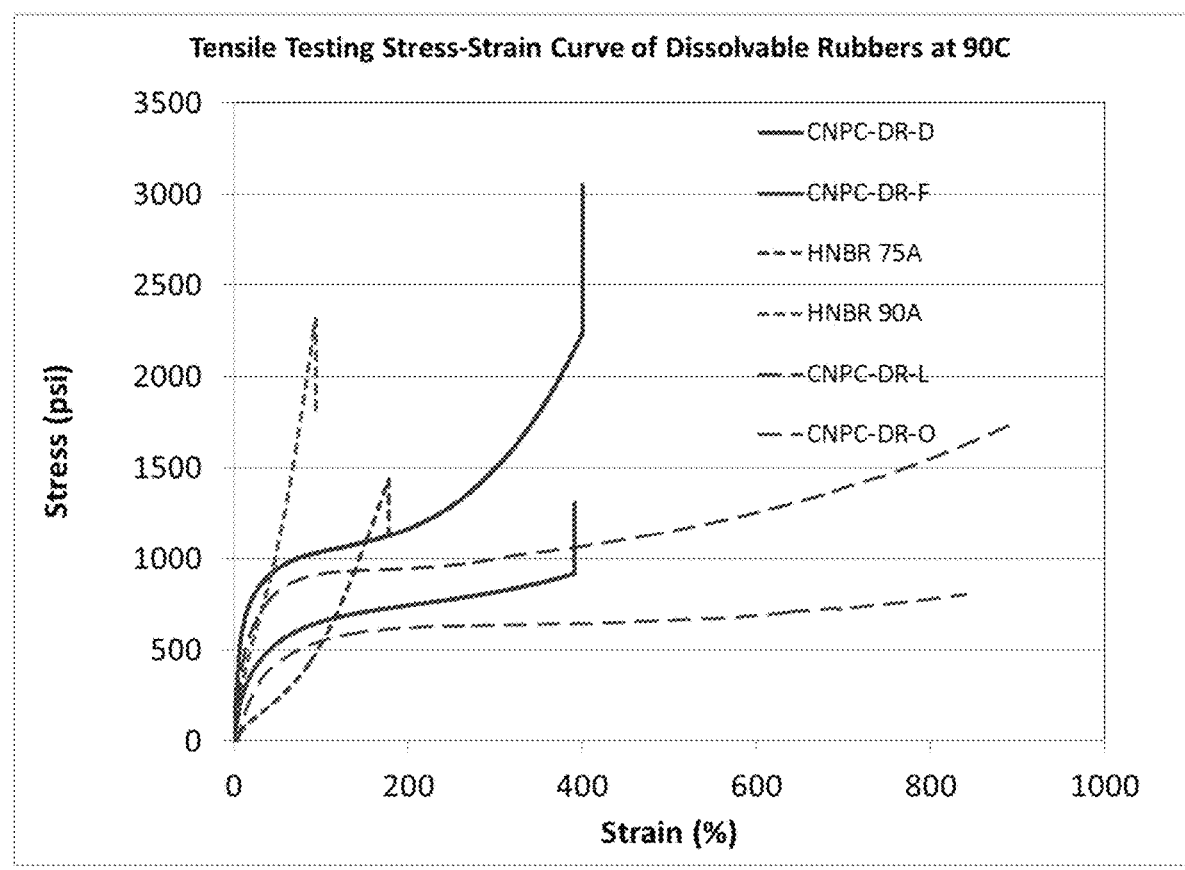
FIG. 6 is a graph illustration of hardness change and time, showing dissolution rates of embodiments of degradable polymeric materials according to the present invention (CNPC-DR-F, CNPC-DR-D, and CNPC-DR-OBK) and prior art rubber material (HNBR 75A, HNBR 90A) at 90° C.

FIG. 6 shows the tensile stress-strain curves for several embodiments of the chemical composition of the present invention in comparison of prior art compositions as common HNBR with 75 and 90 Shore A at 90° C. The initial modulus and elongation of CNPC-DR-F and CNPC-DR-LBK are higher than that of HNBR with 75 durometer respectively, while the initial modulus and elongation of CNPC-DR-D and CNPC-DR-OBK are higher than that of HNBR with 90 durometer respectively. The 100% modulus and elongation of typical dissolvable rubber at 90° C. in the market are ~400 psi, 300%, respectively. The 100% modulus and elongation of the embodiments of the chemical composition of the present invention are much higher than that of the typical dissolvable rubbers in the market. The high modulus and elongation of the embodiments of the chemical composition of the present invention are the major reasons for hold high pressure differential at high temperature.

TABLE 3

Tensile properties

| Material | Ave. Tensile Strength (psi) | Ave. Elong. at Break (%) | Ave. M50 (psi) | Ave. M100 (psi) | Ave. M200 (psi) |
|---|---|---|---|---|---|
| HNBR 75A | 1478 | 178 | 230 | 532 | |
| CNPC-DR-F | 1296 | 565 | 521 | 634 | 721 |
| CNPC-DR-L | 801 | 903 | 431 | 541 | 606 |
| HNBR 90A | 1932 | 93 | 1358 | | |
| CNPC-DR-D | 2584 | 388 | 934 | 1027 | 1157 |
| CNPC-DR-O | 1728 | 916 | 812 | 905 | 936 |

FIG. 5-6 show that embodiments of the chemical composition of the present invention have an average tensile strength over 4500 psi at room temperature depending on Shore A, an average elongation break over 400% at room temperature depending on Shore A, an average tensile strength less than 1300 psi with 84 Shore A at 90° C., an average elongation break over 300% at 90° C. depending on Shore A, and hold a 10000 psi differential over 24 hours. These results establish that the chemical composition has the suitable strength and elasticity to perform the fracturing operation. The isocyanate terminated polyester prepolymer and the cross-linking agent have an average tensile strength over 4500 psi with 84 Shore A at room temperature, an average tensile strength over 7000 psi with 90 Shore A at room temperature, an average elongation break over 500% with 84 Shore A at room temperature, and an average elongation break over 400% with 93 Shore A at room temperature. The isocyanate terminated polyester prepolymer and the cross-linking agent an average elongation break over 500% with 84 Shore A at 90° C. and an average elongation break over 300% with 93 Shore A at 90° C.

Figure 7:
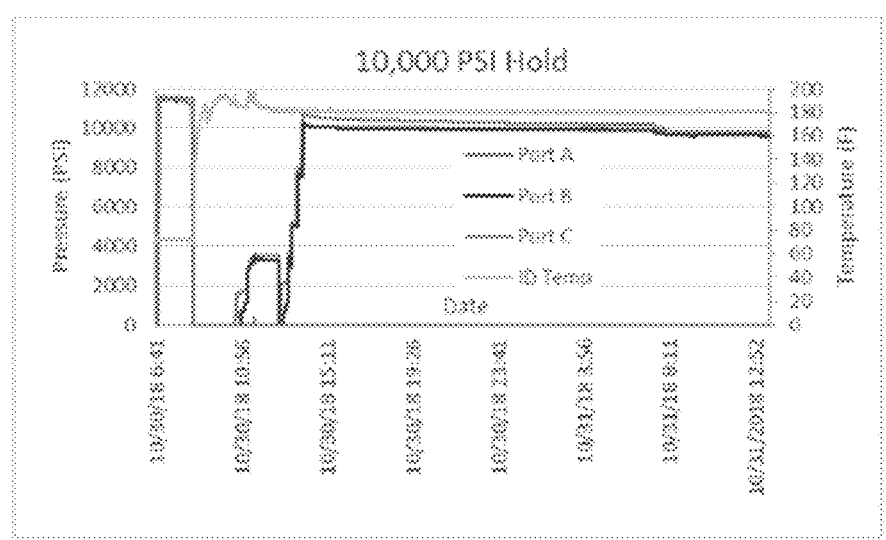
FIG. 7 is a graph illustration of pressure and date, showing pressure holding results of an embodiments of degradable polymeric materials according to the present invention (CNPC-DR-OBK) at 90° C. in water.
Figure 8:
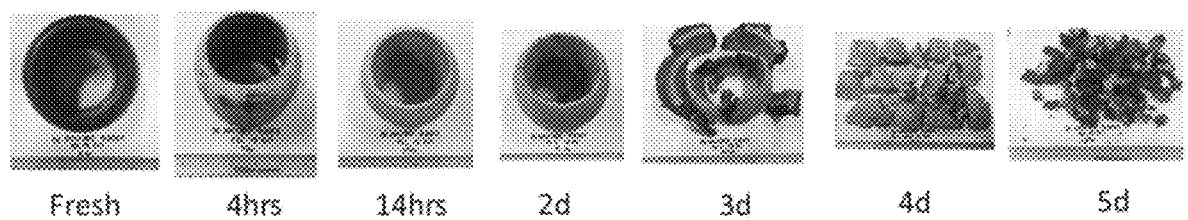
FIG. 8 are photos illustrating dissolution testing results of one of the embodiments of the degradable polymeric material according to the present invention (CNPC-DR-LBK of FIG. 3) in 1.0% KCl at 93° C.

The embodiments of the chemical composition of the present invention were manufactured as dissolvable rubber sealing element. FIG. 7 shows the pressure rating test results of dissolvable rubber sealing element made of CNPC-DR-OBK made from an embodiment of the chemical composition of the present invention. The sealing element hold 10,000 psi differential very stable for more than 24 hours. The sealing element satisfies the fracturing operation requirements. FIG. 8 shows the dissolution process of the dissolvable rubber sealing element of FIG. 7 as made of the embodiment CNPC-DR-LBK at 90 C in 1% KCl. The element broken to small and soft pieces in 5 days. The residues could be easily flow back during operation. Thus, the embodiments of the chemical composition of the present invention can be used as the sealing element of a dissolvable frac plugs, bridge plugs, packers, etc.

FIG. 8 shows the method for removal of a downhole tool. The downhole tool can be an assembly of components, and one of those components can be made of an embodiment of the chemical composition of the present invention. The method comprising the steps of: forming the chemical composition according to present invention into a component, installing the component in an assembly, such as a downhole tool, dissolving the component in 0.3% KCl at 90° C. into a degraded component, and collapsing the assembly so as to remove the assembly and the degraded component. The step of dissolving the component may also include a catalyst that is acidic or basic. The embodiments of the catalyst are selected from a group consisting of: dibutyltin dilaurate, dimethylbis(1-oxoneodecyl), octyltin dithioglycolate, and dioctyltin mercaptide. The step of dissolving includes completely dissolving the degraded component. The downhole tool is removed from the downhole location when the component is degraded to collapse in the borehole.

The invention provides a high modulus, high elongation degradable polymeric material or dissolvable rubber material composition, and the method of manufacturing the composition. The invention also discloses methods to use the chemical composition to make a component with a dissolving rate that can be accelerated by various cross-linkers and catalysts.

The present invention provides a high strength, high modulus, flexible water dissolvable rubber materials made of polyester-polyurethane copolymer. The copolymer can be a low free isocyanate TDI terminated polyester polymer crosslinked with various crosslinkers. The cross-linking agent or crosslinker can include diamines, diols, triols, etc. The preferred crosslinkers were diamines, such as 4,4' methylene-bis-(o-chloroaniline), Dimethyl thio-toluene diamine.

Embodiments of the invention include filler to increase the strength of the embodiments of the chemical composition of the present invention. Fillers can be carbon blacks, silica, nanographene, nanoclay, nanofibers, nanotubes, etc.

The modulus and strength of the copolymer as embodiments of the chemical composition of the present invention could be adjusted by varying the ratio of isocyanate concentration, ester, urethane groups concentration, the prepolymer or prepolymer units. The 100% modulus of the embodiments of the chemical composition of the present invention is more than 880 psi and 500 psi, at room temperature and at 90° C., respectively. The 100% modulus of the typical dissolvable rubbers of the prior art is 600 psi and 400 psi or less, at room temperature and at 90° C., respectively.

The dissolution rate of the embodiments of the chemical composition of the present invention could be controlled by adjusting the cross-linkers grades. The diamine type crosslinkers were used to accelerate the dissolution rate. Alternately, the method of using the embodiments of the chemical composition of the present invention can also have a dissolution rate accelerated by incorporating various catalysts, including, but not limited to dibutyltin dilaurate. The suggested catalyst concentration ranges from 0.01 to 10 wt %. The embodiments of the chemical composition of the present invention as dissolvable rubbers have the applications in oil and gas downhole completion, drilling, measurement tools, such as dissolvable plug, packers, isolation valves, etc.

The foregoing disclosure and description of the invention is illustrative and explanatory thereof. Various changes in the details of the illustrated structures, construction and method can be made without departing from the true spirit of the invention.

We claim:

1. A chemical composition for a degradable polymeric material, the chemical composition comprising:
   a reaction product of an isocyanate terminated polyester prepolymer, a cross-linking agent, wherein the isocyanate terminated prepolymer as a main chain with a plurality of isocyanates at ends of said main chain, said isocyanate terminated polyester prepolymer having a structural formula below:

ONC—R"—NH—[—CO—R—R'"-]n-NH—R"—CNO, wherein R'" is selected from a group consisting of —O— and —CO—O—R'—O—,

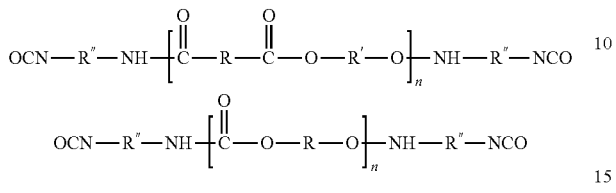

wherein R is an aryl group,
wherein R' is an aryl group,
wherein R" is an aryl group, and
wherein n is a number of prepolymer units corresponding to length of said main chain, wherein said isocyanates are selected from group consisting of 2,4-toluene di-isocyanate, 2,6-toluene di-isocyanate, methylene diphenyl diisocyanate, para-phenyl diisocyanate (pPDI), wherein the cross-linking agent comprises at least one of dimethyl thio-toluene diamine; 4,4' methylene-bis-(o-chloroaniline), and
wherein the reaction product reaches fracturing failure between 8 hours and 30 days in 0.3% KCl at 90° C., maintain less than 5% weight loss within 2 days and display more than 40% weight loss within 20 days in 0.3% KCl at 90° C., and maintain less than 5% hardness loss within 2 days in 0.3% KCl at 90° C.; and
a dissolution rate accelerating agent, wherein the dissolution rate accelerating agent comprises dibutyltin dilaurate.

2. The chemical composition of claim 1,
wherein the reaction product of said isocyanate terminated polyester prepolymer and said cross-linking agent reaches fracturing failure in 0.3% KCl at 90° C. within 15 days, in 1.0% KCl at 93° C. within 4 days, and in 0.3% KCl at 120° C. within 22 hours.

3. The chemical composition of claim 1,
wherein the reaction product of said isocyanate terminated polyester prepolymer and said cross-linking agent maintains less than 5% weight loss in 0.3% KCl at 90° C. within 2 days, and wherein said isocyanate terminated polyester prepolymer and said cross-linking agent display more than 40% weight change in 0.3% KCl at 90° C. within 20 days.

4. The chemical composition of claim 1,
wherein the reaction product of said isocyanate terminated polyester prepolymer and said cross-linking agent maintains less than 5% weight loss in 0.3% KCl at 90° C. within 2 days, and wherein said isocyanate terminated polyester prepolymer and said cross-linking agent delay more than 60% weight change in 0.3% KCl with said catalyst at 90° C. within 20 days.

5. The chemical composition of claim 4,
wherein the reaction product of said isocyanate terminated polyester prepolymer and said cross-linking agent maintain less than 5% hardness loss in 0.3% KCl at 90° C. within 2 days.

6. A chemical composition for a degradable polymeric material, the chemical composition comprising:
a reaction product of an isocyanate terminated polyester prepolymer, a cross-linking agent, wherein the isocyanate terminated prepolymer as a main chain with a plurality of isocyanates at ends of said main chain, said isocyanate terminated polyester prepolymer having a structural formula below:

ONC—R"—NH—[—CO—R—R'"-]n-NH—R"—CNO, wherein R'" is selected from a group consisting of —O— and —CO—O—R'—O—,

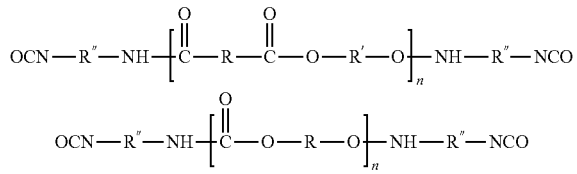

wherein R is an aryl group,
wherein R' is an aryl group,
wherein R" is an aryl group, and
wherein n is a number of prepolymer units corresponding to length of said main chain, wherein said isocyanates are selected from group consisting of 2,4-toluene di-isocyanate, 2,6-toluene di-isocyanate, methylene diphenyl diisocyanate, para-phenyl diisocyanate (pPDI), wherein the cross-linking agent comprises at least one of dimethyl thio-toluene diamine, 4,4' methylene-bis-(o-chloroaniline); and
wherein the reaction product has an average tensile strength over 5000 psi at room temperature with 84 Shore A, an average elongation break over 400% at room temperature with 84 Shore A, an average tensile strength less than 1300 psi with 84 Shore A at 90° C., an average elongation break over 300% at 90° C. with 84 Shore A, and a sealing element made of the material hold a 10000 psi differential over 24 hours; and
a dissolution rate accelerating agent, wherein the dissolution rate accelerating agent comprises dibutyltin dilaurate.

7. The chemical composition of claim 6,
wherein the reaction product of said isocyanate terminated polyester prepolymer and said cross-linking agent has an average tensile strength over 4500 psi with 84 Shore A at room temperature, an average tensile strength over 7000 psi with 93 Shore A at room temperature, an average elongation break over 500% with 84 Shore A at room temperature, and an average elongation break over 400% with 93 Shore A at room temperature.

8. The chemical composition of claim 6,
wherein the reaction product of said isocyanate terminated polyester prepolymer and said cross-linking agent has an average elongation break over 500% with 84 Shore A at 90° C. and an average elongation break over 300% with 93 Shore A at 90° C.

9. A method for formation of a degradable polymeric material, the method comprising the steps of:
vacuuming a prepolymer unit of claim 1;
vacuuming a cross-linking agent;
mixing said prepolymer unit and said cross-linking agent and said dissolution rate accelerating agent so as to form a mixture; and
molding said mixture so as to form a cured polymer as a component.

10. The method for formation, according to claim 9, wherein the step of mixing said prepolymer unit, said cross-linking agent, and said dissolution rate accelerating agent is by centrifuge.

11. The method for formation, according to claim 9, wherein the step of mixing said prepolymer unit, said cross-linking agent said dissolution rate accelerating agent is under vacuum.

12. The method for formation, according to claim 9, wherein the step of mixing said prepolymer unit, said cross-linking agent said dissolution rate accelerating agent further comprises adding a filler.

13. The method for formation, according to claim 12, wherein said filler is selected from a group consisting of carbon blacks, silica, nanographene, nanoclays, nanofibers, and nanotubes.

14. A method for removal, the method comprising the steps of:
    forming a chemical composition according to claim 1 into a component;
    installing said component in an assembly;
    dissolving said component in a solution with salinity less than 0.3% at 90° C. into a degraded component; and
    collapsing said assembly so as to remove said assembly and said degraded component.

15. The method for removal, according to claim 14, wherein the step of dissolving said component further comprises a step of: adding a dissolution rate accelerating agent, and
    wherein said dissolution rate accelerating agent is selected from a group consisting of: an acid and a base.

16. The method for removal, according to claim 15, further comprising: dissolving said degraded component completely.

* * * * *